(12) United States Patent
Ono et al.

(10) Patent No.: US 9,327,606 B2
(45) Date of Patent: May 3, 2016

(54) CHARGING APPARATUS

(75) Inventors: Tomoya Ono, Toyota (JP); Shigeki Kinomura, Toyota (JP); Michiaki Arasu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 168 days.

(21) Appl. No.: 14/123,587

(22) PCT Filed: Jul. 1, 2011

(86) PCT No.: PCT/JP2011/065164
§ 371 (c)(1),
(2), (4) Date: Dec. 3, 2013

(87) PCT Pub. No.: WO2013/005277
PCT Pub. Date: Jan. 10, 2013

(65) Prior Publication Data
US 2014/0111157 A1 Apr. 24, 2014

(51) Int. Cl.
*H02J 7/00* (2006.01)
*B60L 11/18* (2006.01)
*B60L 3/00* (2006.01)
*B60L 3/04* (2006.01)
*B60L 7/14* (2006.01)
(Continued)

(52) U.S. Cl.
CPC ........... *B60L 11/1816* (2013.01); *B60L 3/0069* (2013.01); *B60L 3/04* (2013.01); *B60L 7/14* (2013.01); *B60L 11/123* (2013.01); *B60L 11/14* (2013.01); *B60L 11/1818* (2013.01); *B60L 11/1877* (2013.01); *B60L 2210/10* (2013.01); *B60L 2210/30* (2013.01); *B60L 2210/40* (2013.01); *B60L 2220/14* (2013.01); *B60L 2230/12* (2013.01); *B60L 2270/32* (2013.01); *B60L 2270/34* (2013.01); *H02J 7/0027* (2013.01); *Y02T 10/7005* (2013.01)

(58) Field of Classification Search
CPC ... Y02T 90/14; Y02T 10/7005; Y02T 90/128; Y02T 10/7088; Y02T 90/163
USPC .......................................................... 320/109
See application file for complete search history.

(56) References Cited

U.S. PATENT DOCUMENTS

| 5,323,099 A | 6/1994 | Bruni et al. |
| 5,934,918 A * | 8/1999 | Wuechner ...................... 439/133 |
| 2001/0003413 A1* | 6/2001 | Kajiura ......................... 320/108 |

(Continued)

FOREIGN PATENT DOCUMENTS

| JP | A-6-14470 | 1/1994 |
| JP | 2010-052861 A | 3/2010 |

(Continued)

*Primary Examiner* — Arun Williams
(74) *Attorney, Agent, or Firm* — Oliff PLC

(57) ABSTRACT

A charging apparatus includes a fixed member to be fixed to a fixed object, a charging cable unit including a cable, a connecting portion connected to the cable and to be connected to a charging unit provided for a vehicle, a control unit controlling electric power to be supplied to the charging unit, and a case housing the control unit, a cable holder including a case housing section housing the case so as to be pulled out, the charging cable unit being arranged in the cable holder and the cable holder being attachable/detachable to/from the fixed member, and a restricting portion restricting exiting of the case housed in the case housing section from the case housing section when the cable holder is fitted to the fixed member.

6 Claims, 17 Drawing Sheets

(51) Int. Cl.
*B60L 11/12* (2006.01)
*B60L 11/14* (2006.01)

(56) References Cited

U.S. PATENT DOCUMENTS

| | | | |
|---|---|---|---|
| 2010/0296230 A1* | 11/2010 | Storck et al. | 361/641 |
| 2010/0301802 A1* | 12/2010 | Iida | 320/109 |
| 2011/0037429 A1* | 2/2011 | DeBoer et al. | 320/109 |
| 2011/0149455 A1 | 6/2011 | Ueno et al. | |
| 2011/0169447 A1* | 7/2011 | Brown et al. | 320/109 |

FOREIGN PATENT DOCUMENTS

| | | |
|---|---|---|
| JP | A-2010-226817 | 10/2010 |
| JP | A-2011-50125 | 3/2011 |

* cited by examiner

CHARGING APPARATUS

TECHNICAL FIELD

The present invention relates to a charging apparatus.

BACKGROUND ART

In recent years, with consideration for the environment, the spotlight is focused on a hybrid vehicle, an electric vehicle, a fuel cell vehicle, and the like equipped with a battery.

Accordingly, a charging apparatus for charging the battery mounted on a vehicle from the outside is also receiving attention.

For example, a charging apparatus disclosed in Japanese Patent Laying-Open No. 2010-226817 is a wall hanging type charging apparatus. This charging apparatus includes a cabinet for charging, a flat plate portion provided below the cabinet, a CCID holder formed in the flat plate portion, a CCID fitted in this CCID holder, and a charging cable connected to the CCID and is hooked on the cabinet.

As to the charging apparatus, Japanese Patent Laying-Open No. 6-014470, Japanese Patent Laying-Open No. 2011-050125 and the like also propose various types of charging apparatuses.

CITATION LIST

Patent Literature

PTL 1: Japanese Patent Laying-Open No. 2010-226817
PTL 2: Japanese Patent Laying-Open No. 6-014470
PTL 3: Japanese Patent Laying-Open No. 2011-050125

SUMMARY OF INVENTION

Technical Problem

In the charging apparatus disclosed in Japanese Patent Laying-Open No. 2010-226817, the cable unit including the CCID, the cable and the like cannot be detached from the cabinet and the flat plate portion. This raises a problem in that a vehicle cannot be charged when stopped at a location away from the charging apparatus. There is also a subject that a problem similar to this also arises in charging apparatuses disclosed in Japanese Patent Laying-Open Nos. 6-014470 and 2011-050125.

Moreover, even if the cable unit is detachable from the apparatus body, a long cable may adversely degrade operating efficiency when performing a charging operation thereafter.

Further, in the charging cable unit, a control unit such as a CCID (Charging Circuit Interrupt Device) is a relatively expensive component, and thus requires an antitheft measure. The present invention was made in view of problems as described above, and has an object to provide a charging apparatus wherein a cable holder with a cable unit arranged therein can be detached from the apparatus body, and theft of the control unit is prevented.

Solution to Problem

A charging apparatus according to the present invention includes a fixed member to be fixed to a fixed object, a cable, a charging cable unit, and a cable holder. The charging cable unit includes a connecting portion connected to the cable and to be connected to a charging unit provided for a vehicle, a control unit controlling electric power to be supplied to the charging unit and a case housing the control unit. The cable holder includes a case housing section housing the case so as to be pulled out. The charging cable unit is arranged in the cable holder, and the cable holder is attachable/detachable to/from the fixed member. The charging apparatus includes a restricting portion restricting exiting of the case housed in the case housing section from the case housing section when the cable holder is fitted to the fixed member.

Preferably, the restricting portion is formed on the fixed member and formed so as to project toward the cable holder fitted to the fixed member. The cable holder has formed therein a through hole in which the restricting portion is to be inserted. The restricting portion projects from the through hole with the cable holder fixed to the fixed member.

Preferably, an insertion opening which is open upwardly and communicates with the case housing section and through which the case is inserted is formed in the cable holder. The cable holder includes a supporting portion supporting the bottom of the case located in the case housing section. The through hole is formed above the case housed in the case housing section. The restricting portion is located above the case housed in the case housing section with the cable holder fixed to the fixed member.

Preferably, a fitting section in which a tool for preventing the restricting portion from being removed from the through hole can be fitted is formed in an area of the restricting portion that projects from the through hole. Preferably, the control unit includes a charging circuit interrupt device. Preferably, the charging cable unit is provided detachably from the cable holder.

Advantageous Effects of Invention

According to the charging apparatus of the present invention, the cable unit can be detached while being fitted in the cable holder, which can prevent theft of the control unit.

DESCRIPTION OF EMBODIMENTS

Charging apparatus 40 according to the present embodiment will be described using FIGS. 1 to 17. It is noted that, although the present embodiment will describe the case of charging a battery B mounted on a hybrid vehicle using charging apparatus 40, it is needless to say that it is also applicable to a vehicle with a battery mounted thereon, such as an electric vehicle and a fuel cell vehicle.

Figure 1:
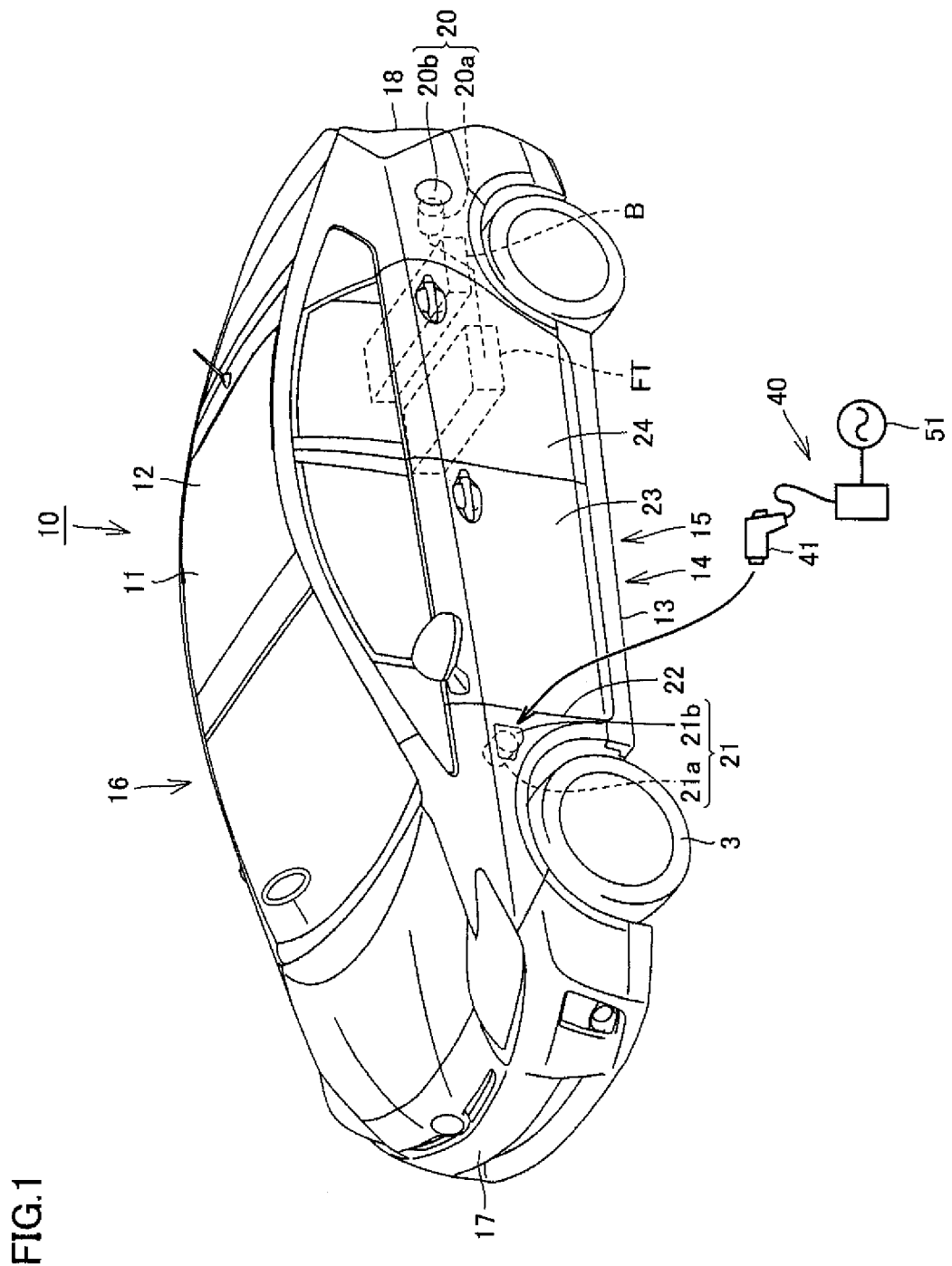
FIG. 1 is a perspective view schematically showing a charging apparatus 40 and a vehicle 10.

FIG. 1 is a perspective view schematically showing charging apparatus 40 and vehicle 10. As shown in this FIG. 1, vehicle 10 charged by charging apparatus 40 is a hybrid vehicle on which a fuel tank FT and battery B are mounted.

Vehicle 10 includes a body 11 forming the outline of vehicle 10, and fuel tank FT and battery B housed in body 11.

The surface of body 11 includes an upper surface 12, a lower surface 13 and a peripheral surface 14, and peripheral surface 14 includes side surfaces 15 and 16, a front surface 17, and a rear surface 18.

Side surface 15 has an entrance opening 22 formed therein, and body 11 includes doors 23 and 24 for opening/closing entrance opening 22.

Side surface 15 is provided with a fuel supply port 20 and a charging unit 21. Fuel supply port 20 is located at a backward side relative to entrance opening 22, and charging unit 21 is located at a forward side relative to entrance opening 22.

Fuel supply port 20 includes a nozzle insertion portion 20a into which a nozzle portion of a fuel supply nozzle provided externally is inserted, and a lid portion 20b provided for body 11. Opening lid portion 20b will expose an opening of nozzle insertion portion 20a to the outside, which allows the nozzle of the fuel supply nozzle to be inserted into nozzle insertion portion 20a.

The nozzle insertion portion is connected to fuel tank FT, and fuel supplied through nozzle insertion portion 20a is supplied to fuel tank FT. It is noted that, in a vehicle equipped with an internal combustion engine, fuel to be supplied can include gasoline, LP gas (Liquefied petroleum gas) and the like, and further, it can include liquid hydrogen, ethanol and the like for a vehicle equipped with a fuel cell.

Charging unit 21 includes a charging connector 21a in which a charging plug provided externally is fitted, and a lid portion 21b provided for body 11. Opening lid portion 21b will expose charging connector 21a to the outside, which allows a charging plug 41 to be fitted in charging connector 21a.

Charging connector 21a of charging unit 21 is supplied with electric power from charging plug 41. Charging connector 21a is connected to battery B with a converter and the like interposed therebetween, and battery B is charged by electric power supplied to charging unit 21.

Figure 2:
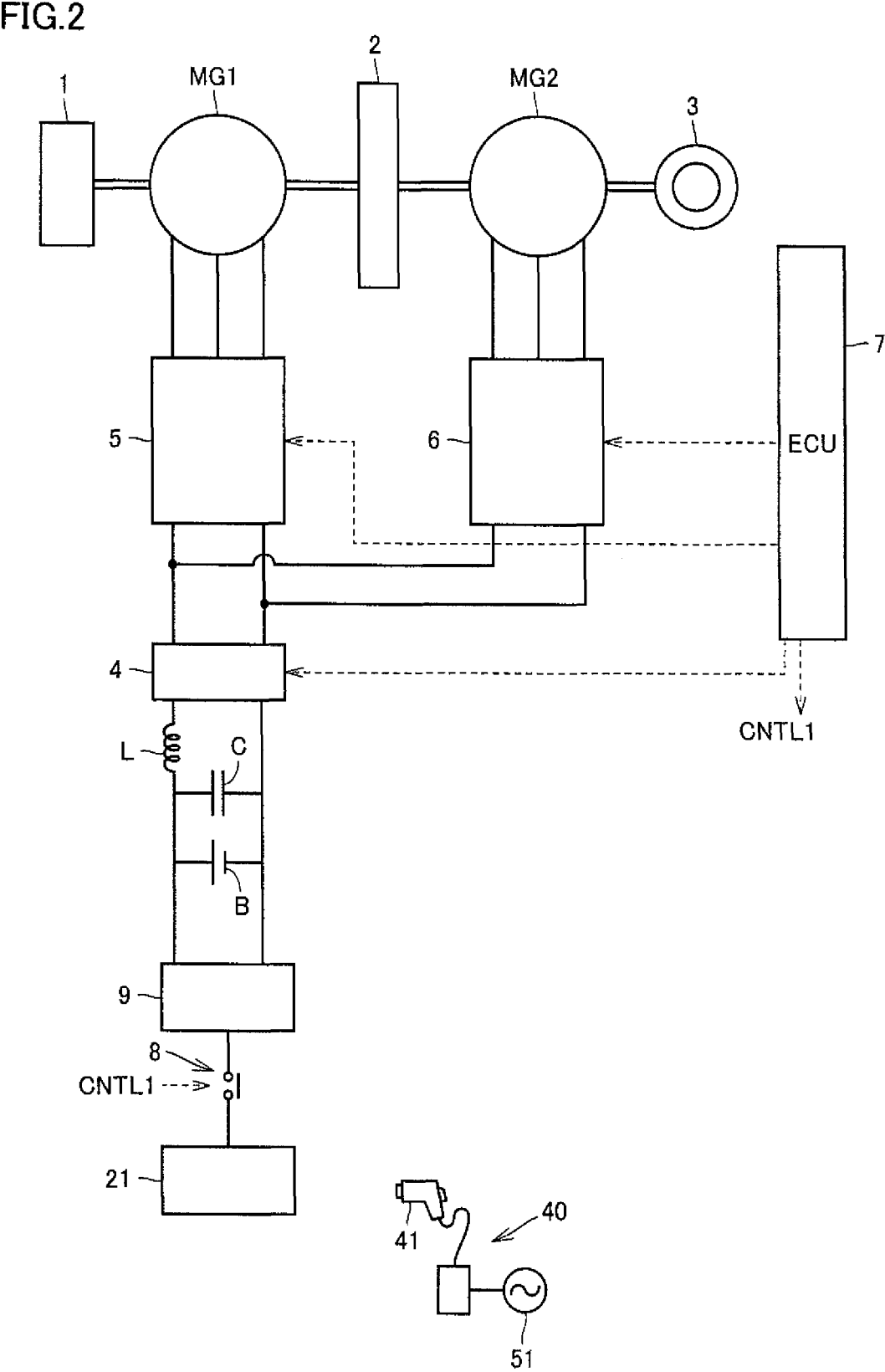
FIG. 2 is a block diagram showing vehicle 10.

FIG. 2 is a block diagram showing vehicle 10. Vehicle 10 includes an engine 1, motor-generators MG1, MG2, a power split device 2, battery B, a capacitor C, a reactor L, a converter 4, inverters 5 and 6, a vehicle ECU (Electronic Control Unit) 7, a switching element 8 such as a relay, a converter 9, and charging unit 21.

Power split device 2 is coupled to engine 1 and motor-generators MG1, MG2, and distributes motive power among them. For example, power split device 2 is implemented by a planetary gear mechanism having three rotation shafts of a, sun gear, a planetary carrier and a ring gear. These three rotation shafts are connected to rotation shafts of engine 1, motor-generators MG1 and MG2, respectively. For example, by forming the rotor of motor-generator MG1 hollow and inserting a crankshaft of engine 1 through its center, engine 1 and motor-generators MG1, MG2 are mechanically connected to power split device 2.

It is noted that the rotation shaft of motor-generator MG2 is coupled to a front wheel 3 as a driving wheel by a reduction gear and a differential gear not shown. A speed reducer for the rotation shaft of motor-generator MG2 may further be incorporated into power split device 2.

Motor-generator MG1 is incorporated into vehicle 10 as operating as a power generator driven by engine 1 and as operating as an electric motor that can start engine 1. Motor-generator MG2 is incorporated into vehicle 10 as an electric motor that drives front wheel 3 as the driving wheel of vehicle 10.

Motor-generators MG1, MG2 are three-phase AC synchronous motors, for example. Motor-generators MG1, MG2 each include, as a stator coil, a three-phase coil consisting of a U-phase coil, a V-phase coil and a W-phase coil.

Motor-generator MG1 produces a three-phase AC voltage by using an engine output, and outputs the produced three-phase AC voltage to inverter 5. Motor-generator MG1 produces a driving force by the three-phase AC voltage received from inverter 5 to start engine 1.

Motor-generator MG2 produces a driving torque for the vehicle by a three-phase AC voltage received from inverter 6. At the time of regenerative braking of the vehicle, motor-generator MG2 produces a three-phase AC voltage for output to inverter 6.

Switching element 8 is provided between converter 9 and charging unit 21. Switching element 8 connects charging apparatus 40 and converter 9, and breaks the connection between charging apparatus 40 and converter 9. Switching element 8 is turned on/off by a control signal CNTL1 of vehicle ECU 7. Driving of converter 9 is controlled by vehicle ECU 7.

When charging battery B by using charging plug 41 of charging apparatus 40, vehicle ECU 7 turns on switching element 8 to connect converter 9 and charging apparatus 40. Vehicle ECU 7 then drives converter 9 such that AC power supplied from the power supply is converted into DC power.

Figure 3:
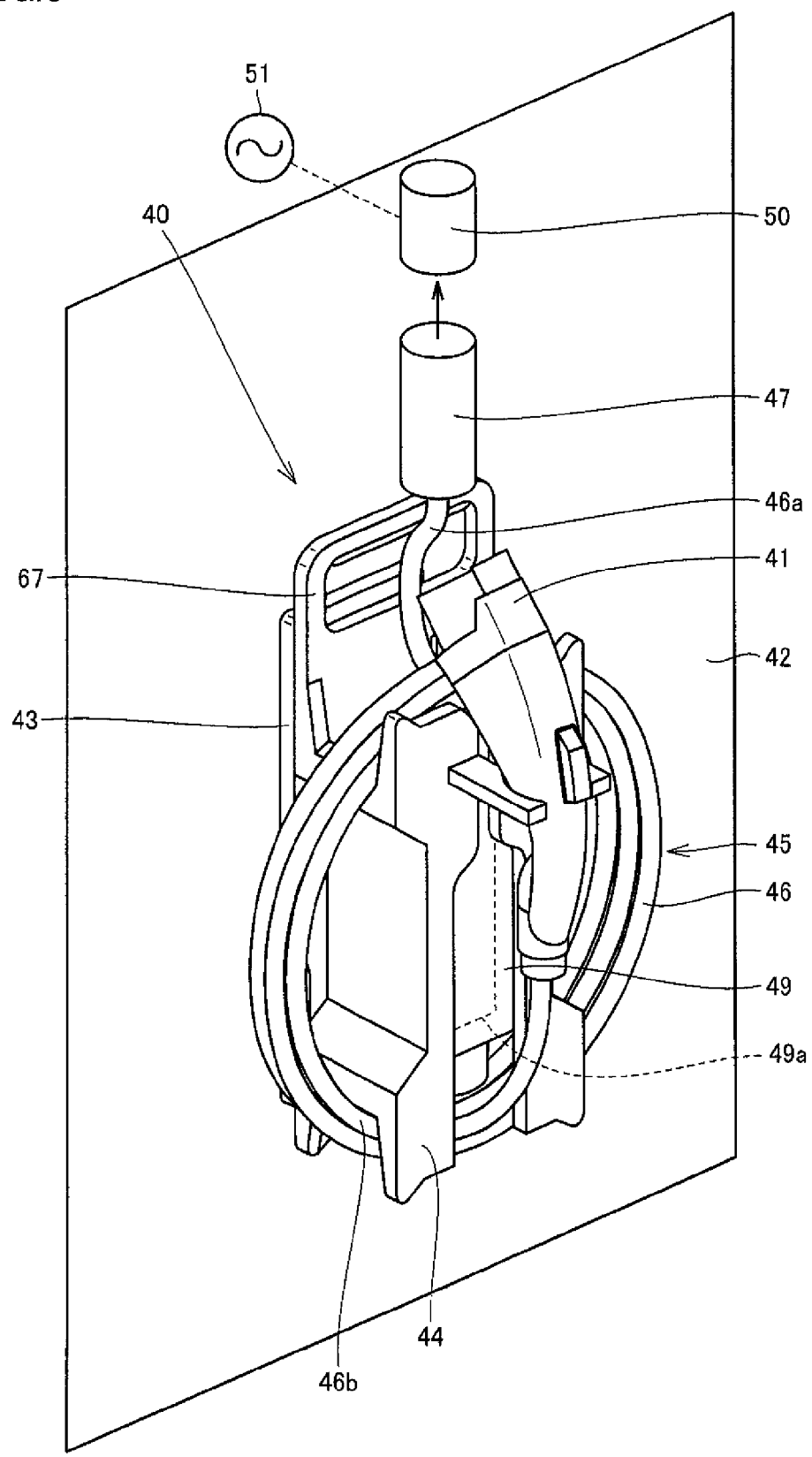
FIG. 3 is a perspective view showing charging apparatus 40.

FIG. 3 is a perspective view showing charging apparatus 40. As shown in this FIG. 3, charging apparatus 40 includes a fixed plate 43 fixed to a wall 42 serving as a fixed object, a cable holder 44 fitted to this fixed plate 43 detachably, and a cable unit 45 fitted in cable holder 44 so as to be detachable from cable holder 44. Wall 42 is, for example, the exterior wall of a house or the like, the exterior wall of a charging station, or the like. Wall 42 may also be the interior wall of a housing case in which charging apparatus 40 is housed.

Cable unit 45 includes a charging cable 46, a power supply plug 47 provided at one end of charging cable 46 and to be connected to a plug socket 50, charging plug 41 provided at the other end of charging cable 46 and to be connected to charging connector 21a, a control unit 49a controlling the amount of electric power supplied from a power supply 51 to charging connector 21a, and a case 49 in which this control unit 49a is housed.

Charging cable 46 includes a cable 46a connecting power supply plug 47 and case 49, and a cable 46b connecting case 49 and charging plug 41.

Control unit 49a housed in case 49 includes a charging circuit interrupt device (CCID). The charging circuit interrupt device is a device for switching between supply and interception of electric power from power supply 51.

Case 49 is provided at a position of charging cable 46 that is located between power supply plug 47 and charging plug 41.

Figure 4:
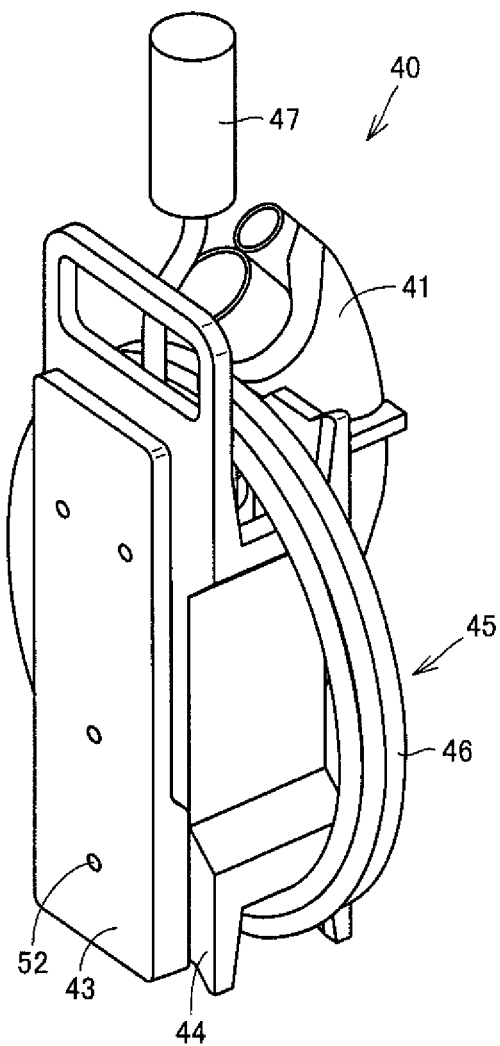
FIG. 4 is a perspective view when charging apparatus 40 is seen from a fixed plate 43 side.

FIG. 4 is a perspective view when charging apparatus 40 is seen from fixed plate 43 side. As shown in this FIG. 4, fixed plate 43 has a plurality of holes 52 formed therein. A bolt or the like not shown is inserted into each of holes 52, and fixed plate 43 is fixed to wall 42 by means of these plurality of bolts.

Figure 5:
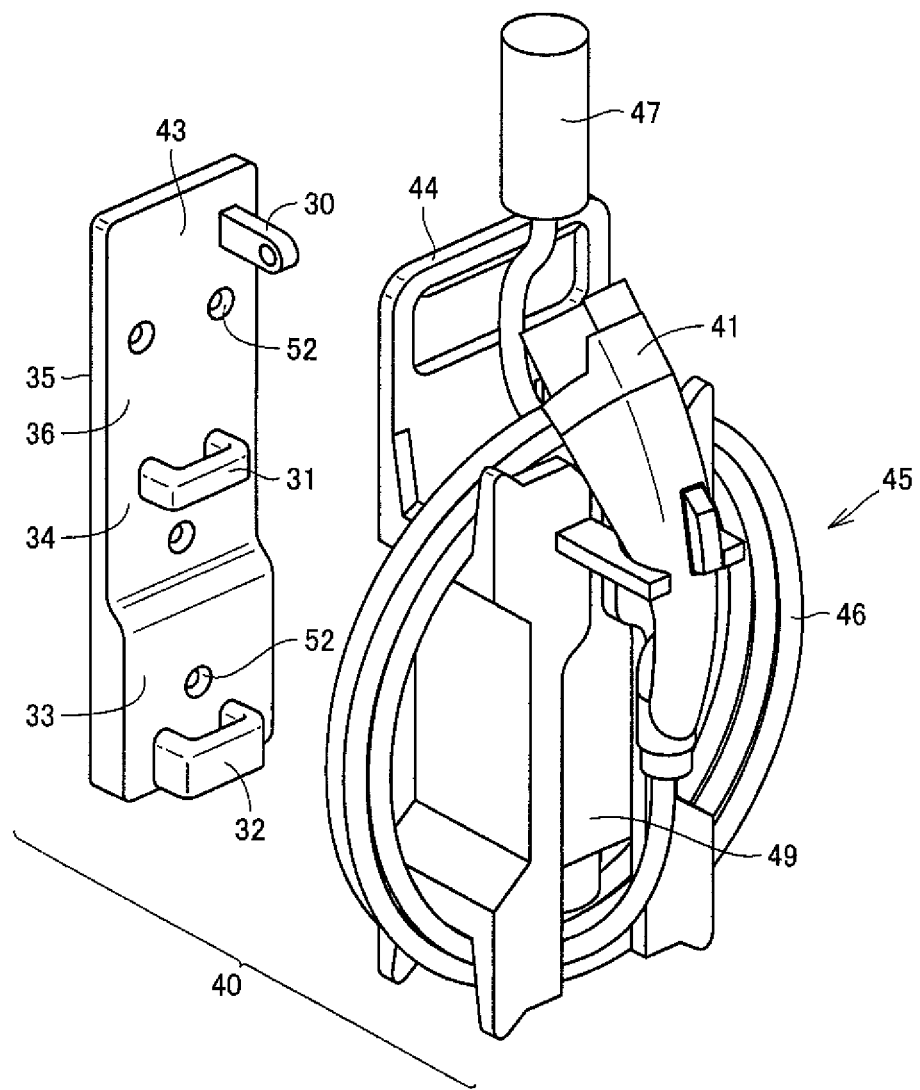
FIG. 5 is a perspective view of charging apparatus 40, showing the state where a cable holder 44 has been detached from fixed plate 43.

FIG. 5 is a perspective view of charging apparatus 40, showing the state where cable holder 44 has been detached from fixed plate 43. As shown in this FIG. 5, fixed plate 43 is in the form of plate, and fixed plate 43 includes a fixed surface 35 to be fixed to wall 42, and an opposite surface 36 opposed to fixed surface 35 in the thickness direction of fixed plate 43. Opposite surface 36 faces the rear wall of cable holder 44 when cable holder 44 is fitted to fixed plate 43.

Fixed plate 43 includes a thick plate portion 33 and a thin plate portion 34 formed on the upper side of thick plate portion 33 and having a thickness thinner than that of thick plate portion 33. A receiving portion 32 is formed at the lower end side of thick plate portion 33, and a receiving portion 31 is formed in thin plate portion 34. Receiving portions 32 and 31 are open upwardly. Receiving portion 31 is formed above receiving portion 32. A projecting portion 30 projecting toward cable holder 44 is formed at a position of opposed surface 36 that is located at the upper end side of thin plate portion 34. Projecting portion 30 is formed above receiving portion 31.

Cable holder 44 is provided so as to be attachable/detachable to/from fixed plate 43, and cable holder 44 can be detached from fixed plate 43 while cable unit 45 is fitted therein.

Figure 6:
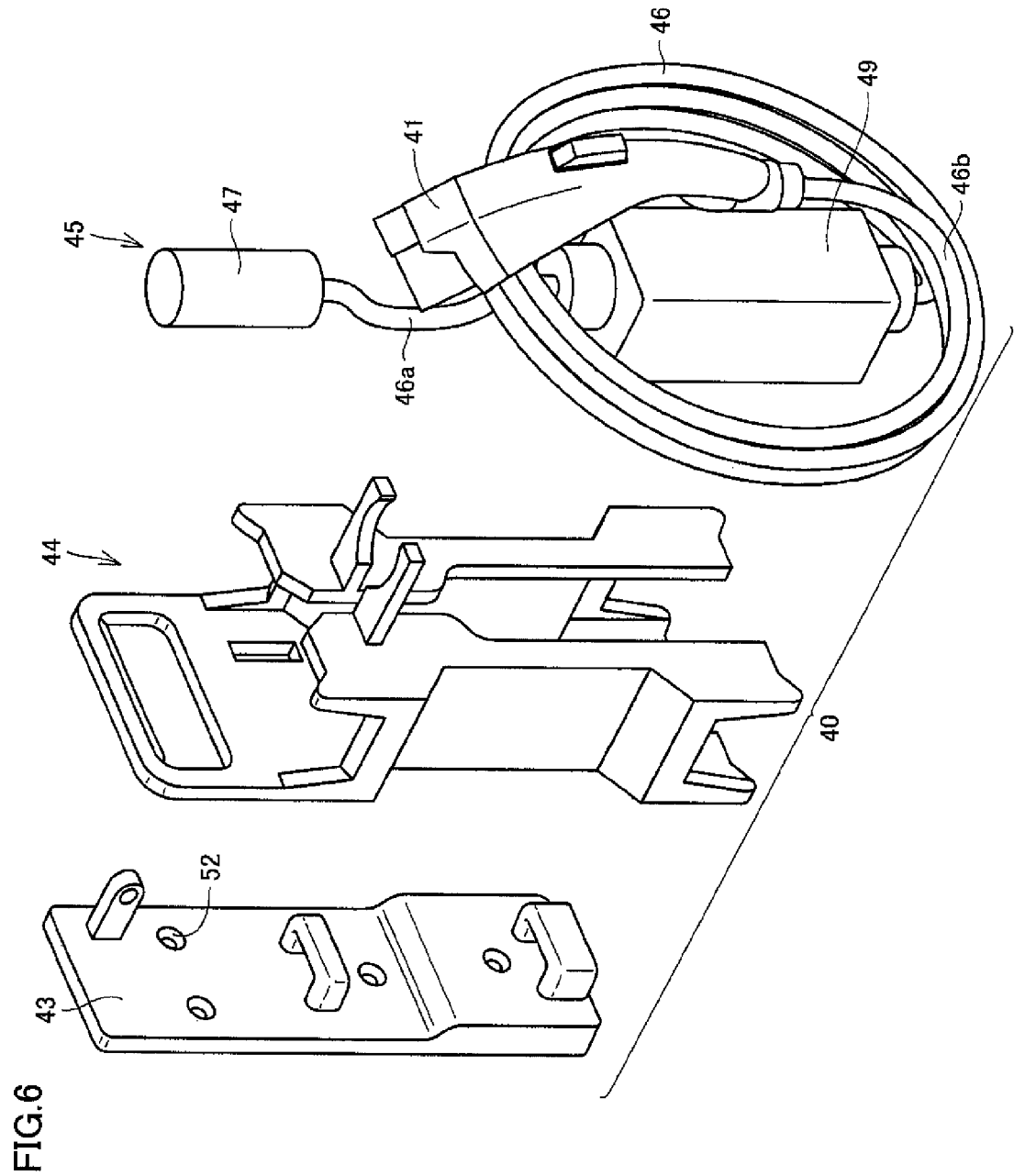
FIG. 6 is a perspective view showing the state where cable holder 44 has been detached from the state shown in FIG. 5.

FIG. 6 is a perspective view showing the state where cable holder 44 has been detached from the state shown in FIG. 5. As shown in this FIG. 6, cable unit 45 is detachable from cable holder 44.

Figure 7:
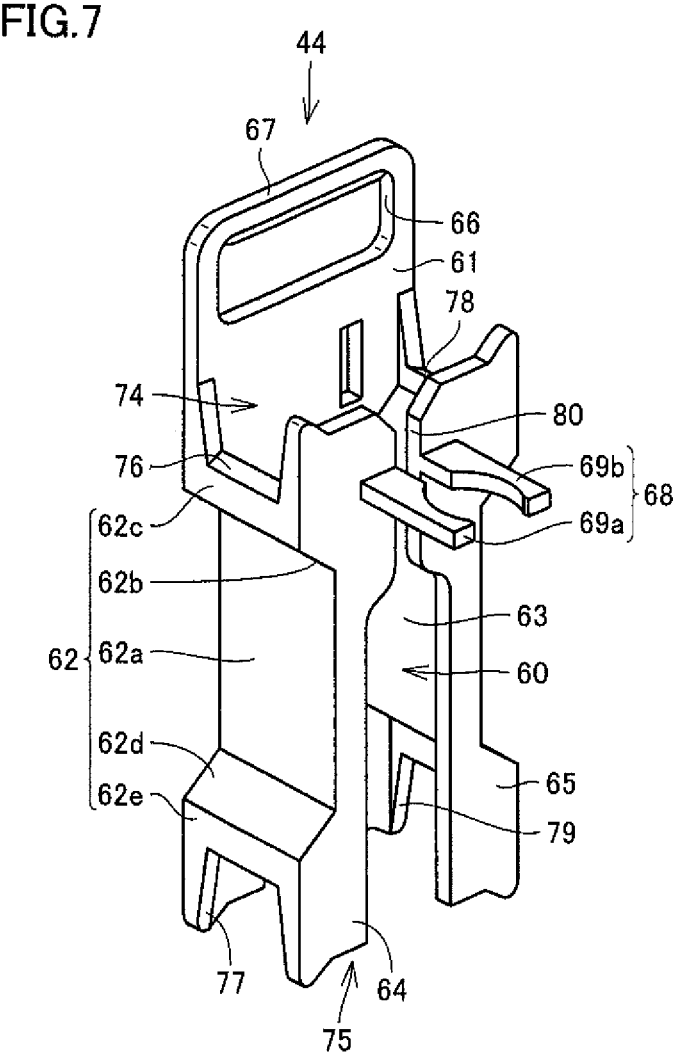
FIG. 7 is a perspective view showing cable holder 44.

FIG. 7 is a perspective view showing cable holder 44. In this FIG. 7, cable holder 44 includes rear wall 61, a sidewall portion 62 formed to rise from a side edge of this rear wall 61, and a sidewall portion 63 formed to rise from the other side edge of rear wall 61. Cable holder 44 further includes a front wall portion 64 formed at the edge of sidewall portion 62 and facing rear wall 61, and a front wall portion 65 formed at the edge of sidewall portion 63 and facing rear wall 61.

A supporting portion 69a projecting forward from front wall portion 64 is formed at the upper end side of front wall portion 64, and a supporting portion 69b projecting forward from front wall portion 65 is formed at the upper end side of front wall portion 65. These supporting portions 69a and 69b are arranged spaced apart in the horizontal direction, and supporting portions 69a and 69b constitute a holder 68 that holds charging plug 41 shown in FIG. 6.

Rear wall 61, sidewall portion 62, sidewall portion 63, front wall portion 64, and front wall portion 65 constitute a housing space 60 in which case 49 is housed.

Sidewall portion 62 includes a vertical wall 62a located at the center of sidewall portion 62 in the height direction, an inclined section 62b formed at the upper end of vertical wall 62a, a rising section 62c formed at the upper end of inclined section 62b, inclined section 62d formed at the lower end of vertical wall 62a, and a trailing section 62e formed at the lower end of inclined section 62d.

Inclined section 62b is formed so as to be distant from sidewall portion 63 as it extends upwardly, and inclined section 62d is formed so as to be distant from sidewall portion 63 as it extends downwardly. A groove portion 76 is formed at the upper side of rising section 62c, and a groove portion 77 is formed at the lower side of trailing section 62e.

Figure 8:
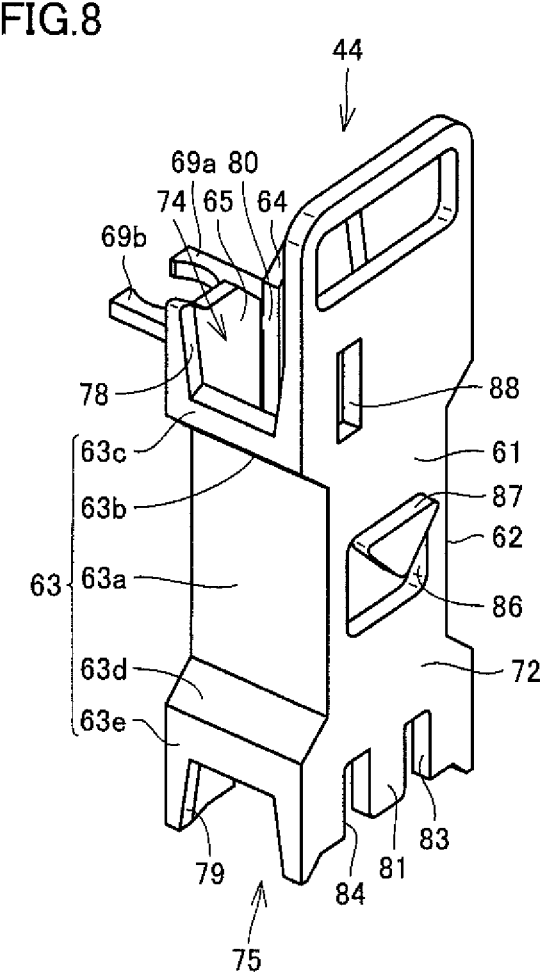
FIG. 8 is a perspective view showing cable holder 44.

FIG. 8 is a perspective view showing cable holder 44. As shown in this FIG. 8, sidewall portion 63 includes a vertical wall 63a located at the center of sidewall portion 63 in the height direction, an inclined section 63b formed at the upper side of vertical wall 63a, a rising section 63c formed at the upper side of inclined section 63b, an inclined section 63d formed at the lower side of vertical wall 63a, and a trailing section 63e formed at the lower side of inclined section 63d.

Inclined section 63b is inclined so as to be distant from sidewall portion 62 as it extends upwardly, and inclined section 63d is inclined so as to be distant from sidewall portion 62 as it extends downwardly. A groove portion 78 is formed at the upper side of rising section 63c, and a groove portion 79 is formed at the lower side of trailing section 63e.

Rear wall 61, the upper side of sidewall portion 62, the upper side of sidewall portion 63, the upper side of front wall portion 64, and the upper side of front wall portion 65 constitute an opening 74 through which case 49 shown in FIG. 6 and the like is inserted. It is noted that opening 74 is open upwardly. Further, rear wall 61, the lower side of sidewall portion 62, the lower side of sidewall portion 63, the lower side of front wall portion 64, and the lower side of front wall portion 65 form an opening 75. A slit 80 is created between front wall portions 64 and 65, which allows charging cable 46 to pass through this slit 80. It is noted that slit 80 is arranged to extend between supporting portions 69a and 69b.

Figure 9:
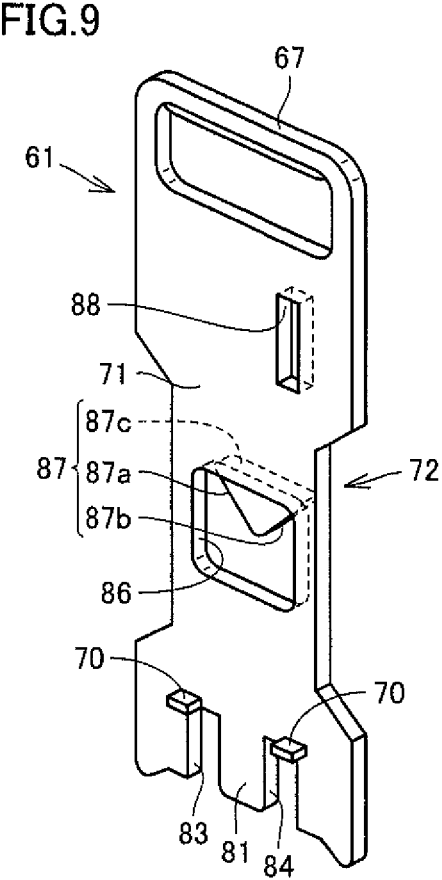
FIG. 9 is a perspective view showing a rear wall 61, and is a perspective view showing the inner surface of rear wall 61.

FIG. 9 is a perspective view showing rear wall 61, and is a perspective view showing the inner surface of rear wall 61. It is noted that, although rear wall 61 is formed integrally with sidewall portion 63 and the like, FIG. 9 and the like illustrate rear wall 61 alone for easy understanding. As shown in FIGS. 9 and 8, rear wall 61 is in the form of plate, and rear wall 61 includes a main surface 71 defining the inner surface of housing space 60 and a rear surface 72 facing fixed plate 43.

Groove portions 83 and 84 formed spaced apart from each other and a projecting portion 81 located between groove portions 83 and 84 are formed at the lower side of rear wall 61.

On main surface 71 of rear wall 61, supporting portions 70 that support case 49 housed in housing space 60 are formed. Supporting portions 70 are formed immediately above groove portions 83 and 84, respectively.

A window portion 86 is formed in an area near the center of rear wall 61 in the height direction that is located above projecting portion 81. On rear surface 72, a projecting portion 87 is formed at the upper side of the opening edge at window portion 86 side. Projecting portion 87 projects downwardly.

Projecting portion 87 is formed such that its width decreases downwardly. Projecting portion 87 includes an upper surface section 87c, a side surface section 87a and a side surface section 87b. Upper surface section 87c is connected to rear surface 72 of rear wall 61. Side surface sections 87a and 87b are formed such that the spacing therebetween decreases as they extend downwardly from upper surface section 87c, and the width of projecting portion 87 is formed so as to decrease downwardly. In this manner, side surface sections 87a and 87b are both inclined surfaces.

A long hole portion 88 is formed in an area of rear wall 61 that is located above window portion 86 and projecting portion 87. Long hole portion 88 extends through rear wall 61, and is formed to extend in the height direction of rear wall 61. A gripping portion 67 is formed above long hole portion 88.

It is noted that projecting portion 81 enters receiving portion 32 shown in FIG. 5, projecting portion 87 enters receiving portion 31 shown in FIG. 5, and further, projecting portion 30 shown in FIG. 5 enters long hole portion 88, so that cable holder 44 is fitted to fixed plate 43 as shown in FIGS. 3 and 4.

Therefore, a fitting method for fitting cable unit 45 in cable holder 44 and a fitting method for fitting cable holder 44 to fixed plate 43 will now be described using FIGS. 10 to 17, FIGS. 3 to 5, and the like.

Figure 10:
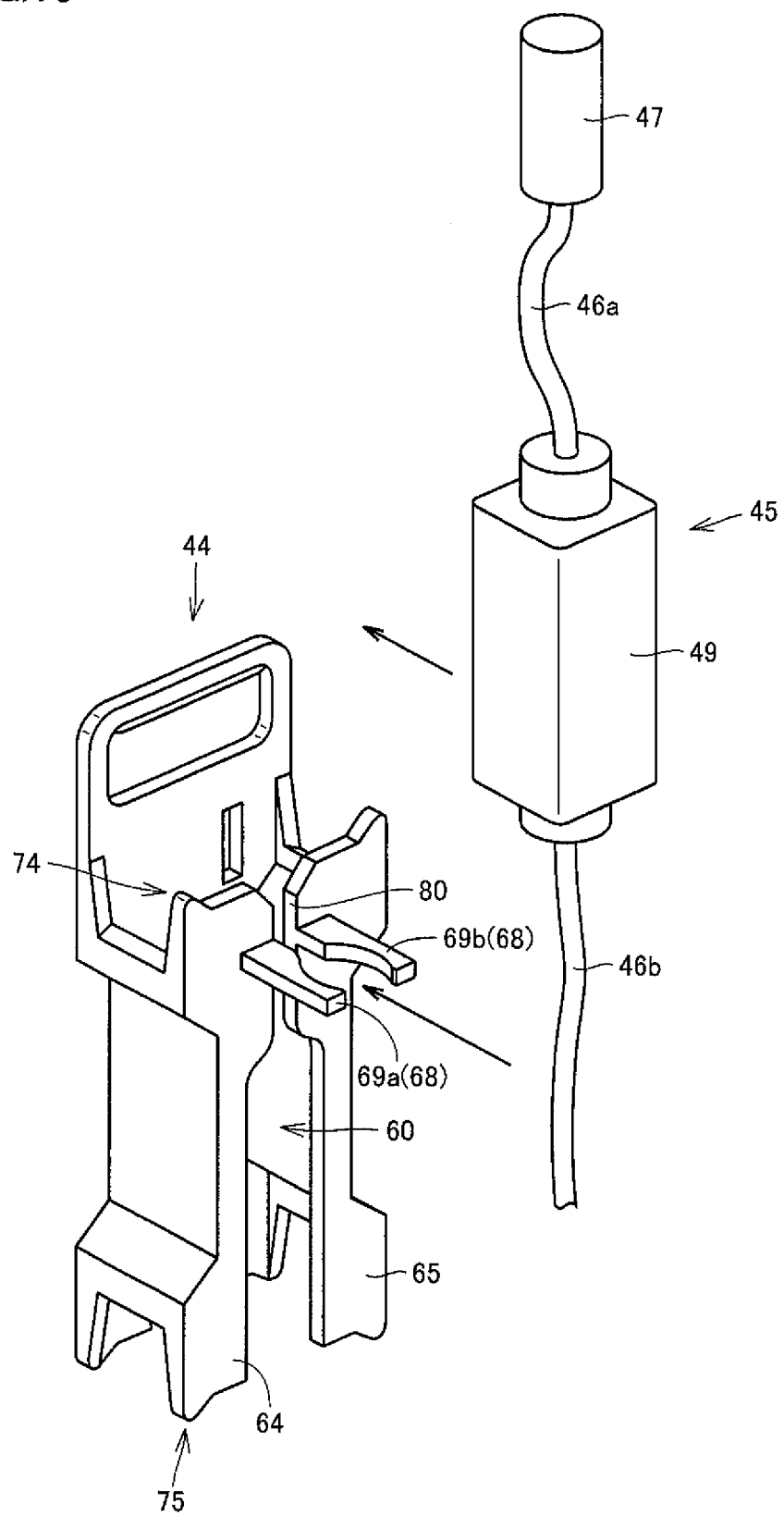
FIG. 10 is a perspective view showing a first procedure when fitting a cable unit 45 in cable holder 44.
Figure 11:
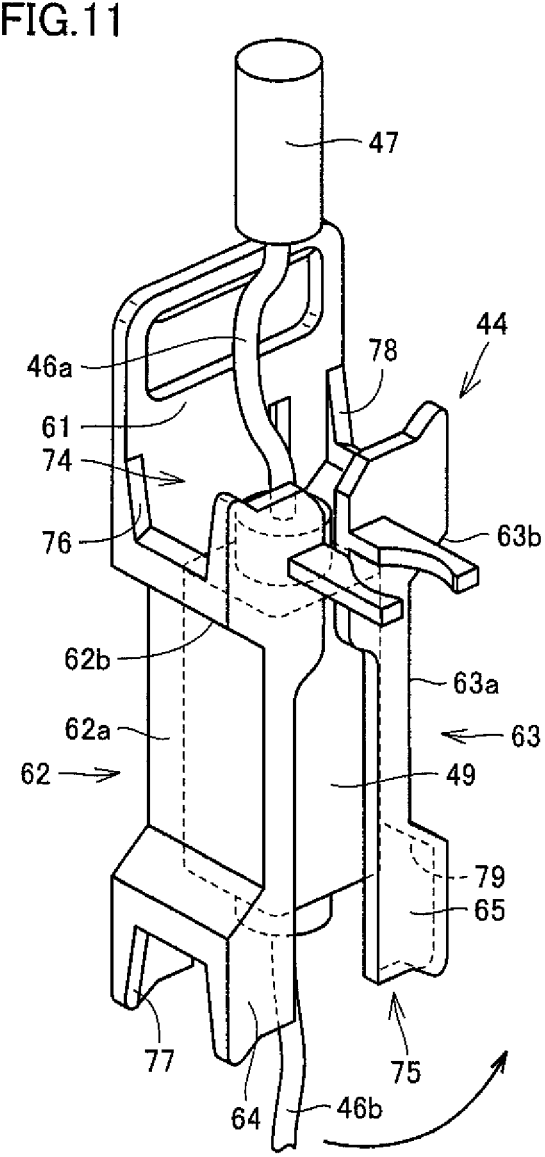
FIG. 11 is a perspective view showing a second procedure when fitting cable unit 45 in cable holder 44.

FIG. 10 is a perspective view showing a first procedure when fitting cable unit 45 in cable holder 44. As shown in this FIG. 10, cable 46b of cable unit 45 is inserted into housing space 60 through slit 80. Thereafter, as shown in FIG. 11, case 49 is inserted into housing space 60 from above opening 74. The bottom of case 49 is thereby supported by supporting portions 70 shown in FIG. 9, so that case 49 is fitted within cable holder 44.

At this time, the side surfaces of case 49 are supported by vertical walls 62a and 63a, which prevents case 49 from moving in the lateral direction within cable holder 44 after case 49 is housed in cable holder 44.

It is noted that, since inclined sections 62b and 63b are formed such that the spacing therebetween increases as they extend upwardly, opening 74 is so large that case 49 is easily inserted through opening 74. Cable 46b hangs down from opening 75.

As shown in this FIG. 11, after fitting case 49 within cable holder 44, cable 46b is wound around cable holder 44.

Specifically, cable 46b is wound around cable holder 44 such that cable 46b runs through groove portion 79, above sidewall portion 63, through groove portion 78, through groove portion 76, above sidewall portion 62, and through groove portion 77 successively. Cable 46b is thereby arranged between front wall portions 64, 65 and rear wall 61, and cable 46b extends along sidewall portions 62 and 63.

Figure 12:
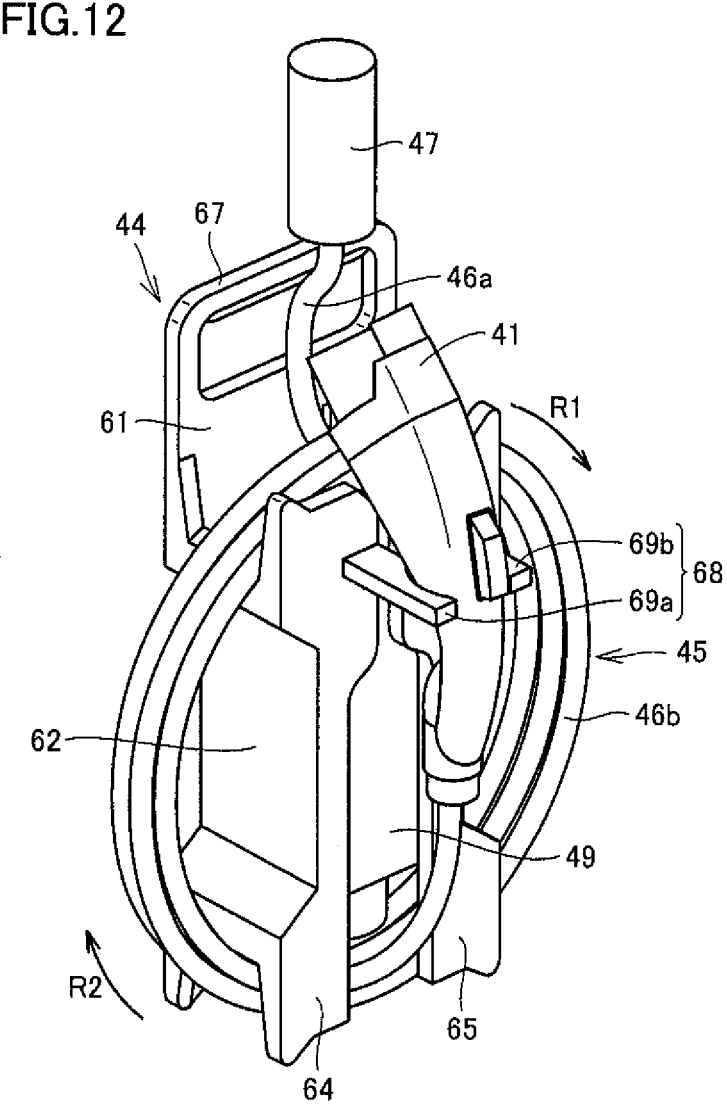
FIG. 12 is a perspective view showing a third procedure when fitting cable unit 45 in cable holder 44.

Thereafter, charging plug 41 is fitted in holder 68 as shown in FIG. 12. At this time, charging plug 41 projects upwardly from cable 46b wound around cable holder 44. Specifically, it is arranged so as to overhang cable 46b wound around cable holder 44. This can prevent cable 46b wound around cable holder 44 from being unwound.

Further, in FIGS. 12 and 11, cable 46b enters groove portions 77 and 79 in the state where cable unit 45 is fitted in cable holder 44. When this cable holder 44 is located on the ground, on the lower end of cable holder 44, the corner portion between rear wall 61 and sidewall portion 62, the corner portion between sidewall portion 62 and front wall portion 64, the corner portion between front wall portion 65 and sidewall portion 62, and the corner portion between rear wall 61 and sidewall portion 63 contact the ground. Cable holder 44 can thereby be self-supporting on the ground in the case where cable unit 45 is fitted in cable holder 44. In this manner, each corner of the lower end of cable holder 44 serves as a mounting portion. It is noted that, although it has been described the case where a located plane on which cable unit 45 is placed is typically the ground, cable unit 45 can be located at various places as a matter of course.

The fitting method for fitting cable holder 44 to fixed plate 43 after fitting cable unit 45 in cable holder 44 as described above will now be described using FIGS. 13 to 16. It is noted that FIGS. 13 to 16 show fixed plate 43 and rear wall 61 of cable holder 44 for ease of description, and the remaining portions of cable holder 44 are not shown.

Herein, as shown in FIG. 12, when gripping cable holder 44 with cable unit 45 fitted therein by gripping portion 67, the upper end side of cable holder 44 will be shifted in a rotation direction R1 relative to the lower end side, and the lower end side will be shifted in a rotation direction R2 relative to the upper end side. This is because the center of gravity of cable holder 44 with cable unit 45 fitted therein is positioned at the forward side.

Figure 13:
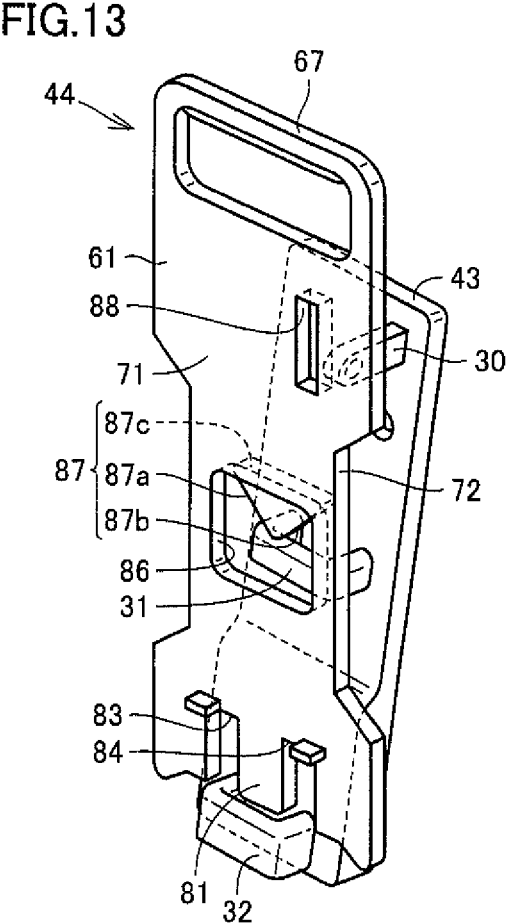
FIG. 13 is a perspective view schematically showing a first procedure when fitting cable holder 44 to fixed plate 43.

As a result, as shown in FIG. 13, when cable holder 44 is going to be fitted to fixed plate 43, the upper end of rear wall 61 will be farther away from fixed plate 43, and the lower end of rear wall 61 will approach fixed plate 43.

Thereby, projecting portion 81 is easily visible to the operator from above cable holder 44 when he/she is going to fit cable holder 44 to fixed plate 43, so that projecting portion 81 and the opening of receiving portion 32 can easily be aligned. Further, since receiving portion 32 is formed in thick plate portion 33, receiving portion 32 is easily visible to the operator, so that receiving portion 32 and projecting portion 81 can easily be aligned.

Figure 14:
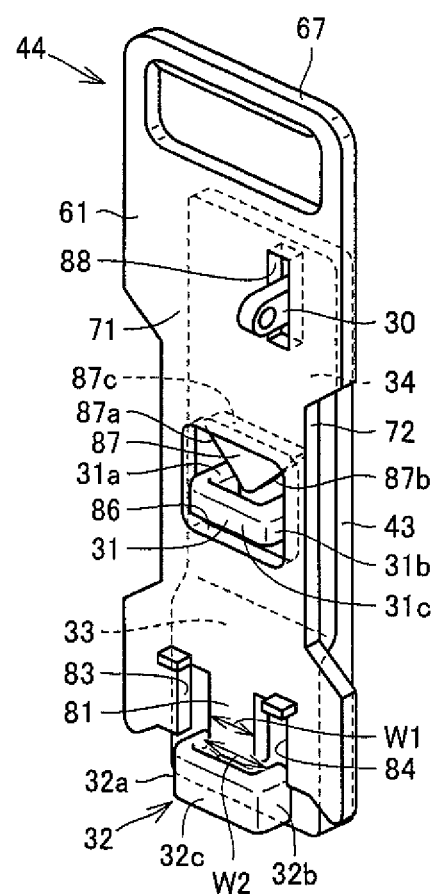
FIG. 14 is a perspective view schematically showing a second procedure when fitting cable holder 44 to fixed plate 43.

Thereafter, as shown in FIG. 14, cable holder 44 is pressed against fixed plate 43 such that rear wall 61 of cable holder 44 follows fixed plate 43. At this time, even when cable holder 44 is pressed against fixed plate 43, receiving portion 31 and projecting portion 87 are easily visible to the operator from above since receiving portion 31 is formed in thin plate portion 34. At this time, projecting portion 87 is spaced from and located above the opening of receiving portion 31, and part of receiving portion 31 enters window portion 86. Receiving portion 31 includes side surface sections 31a and 31b arranged in the width direction and a front section 31c entering window portion 86. It is noted that, at this time, projecting portion 30 extends through long hole portion 88, and the lower end of projecting portion 81 is located immediately above receiving portion 32.

Receiving portion 32 includes side surface sections 32a and 32b arranged in the width direction and a front section 32c that connects side surface sections 32a and 32b. Then, when cable holder 44 is lowered downwardly from this state shown in FIG. 14, side surface section 32a will start entering groove portion 83, and side surface section 32b will start entering groove portion 84. Projecting portion 81 will also start entering receiving portion 32. On the other hand, projecting portion 87 will move to a position immediately above the opening of receiving portion 31.

Herein, since projecting portion 81 has a width W1 smaller than a width W2 of the opening of receiving portion 32, the operator can easily insert projecting portion 81 into receiving portion 32.

When cable holder 44 is lowered further downwardly, the lower end of projecting portion 87 will start entering receiving portion 31. Relatively, projecting portion 30 will start shifting toward the upper end side of long hole portion 88. Projecting portion 87 includes side surface sections 87a and 87b inclined such that the spacing therebetween decreases downwardly. Therefore, even if projecting portion 87 is not correctly located at the center of receiving portion 31, either side surface section 87a or side surface section 87b will contact side surface section 31a or 31b of receiving portion 31, and cable holder 44 will be shifted such that the leading end of projecting portion 87 is located at the center of receiving portion 31.

Thereby, even if cable holder 44 is in a misaligned condition, it is possible to shift cable holder 44 to a predetermined position.

Figure 15:
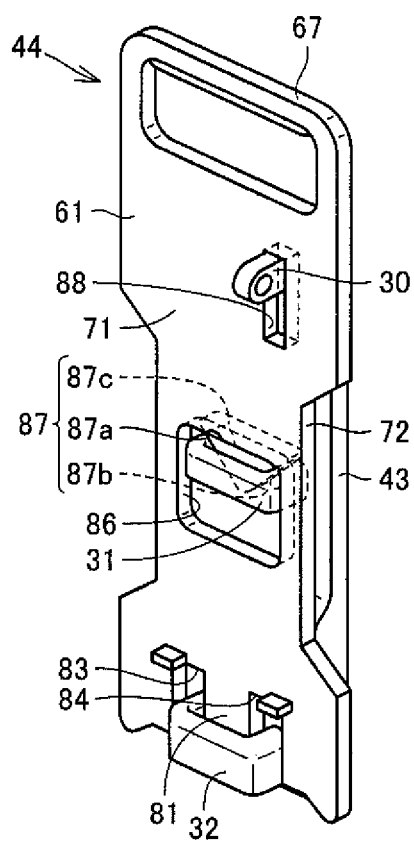
FIG. 15 is a perspective view schematically showing a third procedure when fitting cable holder 44 to fixed plate 43.

Then, as shown in FIG. 15, when cable holder 44 is lowered still downwardly, projecting portion 81 enters receiving portion 32, and projecting portion 87 enters receiving portion 31. Further, projecting portion 30 arrives at the upper end of long hole portion 88, and the operation of fitting cable holder 44 to fixed plate 43 is completed.

Herein, when cable holder 44 is fitted to fixed plate 43, the upper end of side surface section 87a shown in FIG. 14 will contact side surface section 31a, and the upper end of side surface section 87b will contact side surface section 31b. This prevents rear wall 61 from rattling in the width direction.

Figure 16:
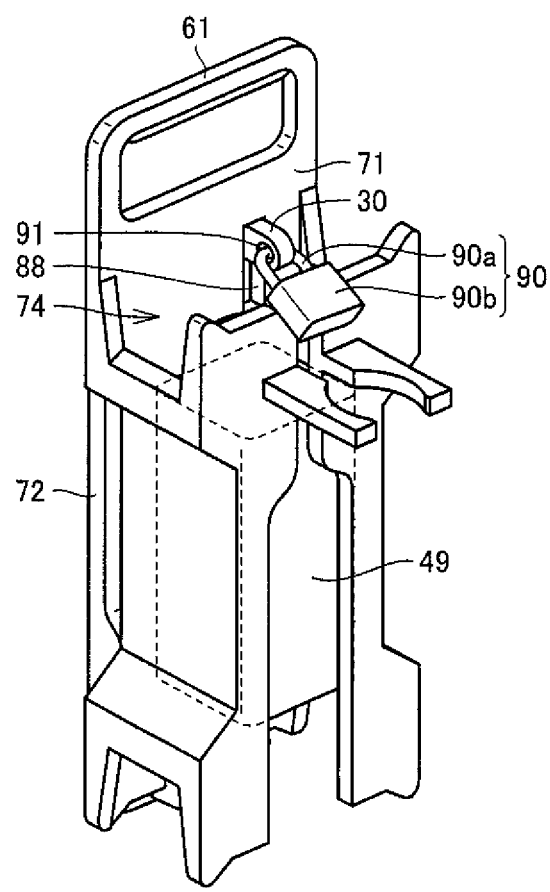
FIG. 16 is a perspective view showing the state where cable holder 44 with cable unit 45 fitted therein is fitted to fixed plate 43.
Figure 17:
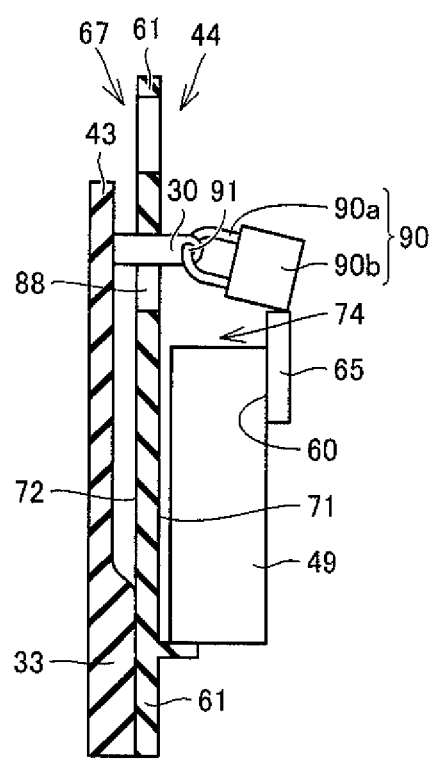
FIG. 17 is a cross sectional view showing cable holder 44 and fixed plate 43 shown in FIG. 16.

FIG. 16 is a perspective view showing the state where cable holder 44 with cable unit 45 fitted therein is fitted to fixed plate 43. In this FIG. 16, charging cable 46, power supply plug 47 and the like of cable unit 45 are not shown. FIG. 17 is a cross sectional view showing cable holder 44 and fixed plate 43 shown in FIG. 16.

As shown in FIGS. 16 and 17, projecting portion 30 extends through long hole portion 88, and projects from main surface 71. Since projecting portion 30 is inserted in long hole portion 88, the range where cable holder 44 shifts upwardly is restricted, Further, since projecting portion 87 is inserted in receiving portion 31 and projecting portion 81 is inserted in receiving portion 32 as shown in FIG. 15, cable holder 44 is prevented from rattling in the state where cable holder 44 is fitted to fixed plate 43. Projecting portion 30 is located above case 49 located within housing space 60.

Therefore, even in an attempt to pull out case 49 through opening 74, case 49 will interfere with projecting portion 30, and case 49 is unlikely to be removed from cable holder 44.

Further, a hole 91 is formed in an area of the leading end of projecting portion 30 that projects from main surface 71, and a lock 90 is fitted in this hole 91. It is noted that, although the example where the hole is formed in the leading end of projecting portion 30 is described as the structure for fitting lock 90 therein, it is needless to say that various forms can be adopted as the structure for fitting a tool such as lock 90 therein.

Lock 90 includes an insertion shaft 90a inserted in hole 91 and a lock body 90b engaged with insertion shaft 90a.

Insertion shaft 90a is formed in a U-shape, and one end of insertion shaft 90a is rotatably provided in lock body 90b. The other end of insertion shaft 90a is inserted in an opening formed in lock body 90b, and is inserted detachably. Lock body 90b has a keyhole not shown formed therein, and inserting a predetermined key into the keyhole will allow the engaged condition of the other end of insertion shaft 90a and lock body 90b to be disengaged.

In this manner, fitting lock 90 in projecting portion 30 can prevent projecting portion 30 from being removed from long hole portion 88, and can prevent cable holder 44 from being detached from fixed plate 43.

A procedure for detaching cable holder 44 fitted to fixed plate 43 and a procedure for detaching cable unit 45 fitted in cable holder 44 will now be described using the respective drawings. As shown in FIGS. 17 and 3, at the time of detaching cable holder 44 from the state where cable holder 44 is fitted to fixed plate 43, lock 90 is detached from projecting portion 30.

Thereafter, gripping portion 67 is gripped to pull up cable holder 44. At this time, a gap that allows the user to insert his/her finger(s) is left between cable holder 44 and wall 42 since fixed plate 43 has thick plate portion 33 formed to project toward cable holder 44. Therefore, the user can easily grip the gripping portion. Then, by pulling up cable holder 44, projecting portion 87 is pulled out from receiving portion 31, and further, projecting portion 81 is pulled out from receiving portion 32, as shown in FIG. 14. Then, by pulling cable holder 44 forwardly, cable holder 44 can easily be detached from fixed plate 43 as shown in FIG. 5.

Thereafter, as shown in FIG. 11, cable 46b is detached from cable holder 44. Then, as shown in FIG. 10, case 49 is pulled out through opening 74. Thereafter, cable 46b is taken out through slit 80 to the outside. In this manner, cable unit 45 can easily be detached from cable holder 44.

It is noted that, although the present embodiment has described the example where cable unit 45 can be detached from cable holder 44, the present invention is not limited to this example. For example, cable unit 45 may be connected to cable holder 44, and this cable holder 44 may be attachable/detachable to/from fixed plate 43.

In charging apparatus 40 thus constructed, the operator detaches cable holder 44 from fixed plate 43. Then, suitably at a workplace, charging plug 41 and charging cable 46 are pulled out from cable holder 44, and are connected to cable holder 44 of the vehicle. Further, power supply plug 47 is pulled out from cable holder 44, and power supply plug 47 is connected to plug socket 50.

When the charging operation is completed, charging cable 46 is wound around cable holder 44, and charging plug 41 is fitted in cable holder 44. Then, cable holder 44 is fitted to fixed plate 43.

In this manner, even in charging apparatus 40 with charging cable 46 connected to cable holder 44, cable holder 44 can be freely portable, so that operating efficiency can be improved.

It should be understood that the embodiments disclosed herein are illustrative and non-restrictive in every respect. The scope of the present invention is defined by the claims, and is intended to include any modification within the meaning and scope equivalent to the terms of the claims. Further, the above-described numerical values and the like are illustrative, and the above-described numerical values and ranges are not limitations.

INDUSTRIAL APPLICABILITY

The present invention is applicable to a charging apparatus.

REFERENCE SIGNS LIST 1 engine; 2 power split device; 3 front wheel; 4 converter; 5, 6 inverter; 8 switching element; 9 converter; 11 body; 12 upper surface; 13 lower surface; 14 peripheral surface; 15, 16 side surface; 17 front surface; 18 rear surface; 20 fuel supply port; 20a nozzle insertion portion; 20b, 21b lid portion; 21 charging unit; 21a charging connector; 22 entrance opening; 23, 24 door; 30, 81, 87 projecting portion; 31, 32 receiving portion; 33 thick plate portion; 34 thin plate portion; 40 charging apparatus; 41 charging plug; 42 wall; 43 fixed plate; 44 cable holder; 45 cable unit; 46 charging cable; 46a, 46b cable; 47 power supply plug; 49 case; 50 plug socket; 51 power supply; 52, 91 hole; 60 housing space; 61 rear wall; 62, 63 sidewall portion; 62a, 63a vertical wall; 62b, 62d, 63b, 63d inclined section; 62c, 63c rising section; 62e, 63e trailing section; 64, 65 front wall portion; 67 gripping portion; 68 holder; 69a, 69b, 70 supporting portion; 71, 72 main surface; 74, 75 opening; 76, 77, 78, 79, 83, 84 groove portion; 80 slit; 86 window portion; 87a, 87b side surface section; 87c upper surface section; 88 long hole portion; 90 lock; 90a insertion shaft; 90b lock body

The invention claimed is:

1. A charging apparatus comprising:
a fixed member to be fixed to a fixed object;
a charging cable unit including a connecting portion connected to said cable and to be connected to a charging unit provided for a vehicle, a control unit controlling electric power to be supplied to said charging unit, and a case housing said control unit;

a cable holder including a case housing section housing said case so as to be pulled out, said charging cable unit being arranged in said cable holder and said cable holder being attachable/detachable to/from said fixed member; and a restricting portion restricting exiting of said case housed in said case housing section from said case housing section when said cable holder is fitted to said fixed member.

2. The charging apparatus according to claim 1, wherein said restricting portion is formed on said fixed member and formed so as to project toward said cable holder fitted to said fixed member, said cable holder has formed therein a through hole in which said restricting portion is to be inserted, and said restricting portion projects from said through hole with said cable holder fixed to said fixed member.

3. The charging apparatus according to claim 2, wherein an insertion opening which is open upwardly and communicates with said case housing section and through which said case is inserted is formed in said cable holder, said cable holder includes a supporting portion supporting the bottom of said case located in said case housing section, said through hole is formed above said case housed in said case housing section, and said restricting portion is located above said case housed in said case housing section with said cable holder fixed to said fixed member.

4. The charging apparatus according to claim 2, wherein a fitting section in which a tool for preventing said restricting portion from being removed from said through hole can be fitted is formed in an area of said restricting portion that projects from said through hole.

5. The charging apparatus according to claim 1, wherein said control unit includes a charging circuit interrupt device.

6. The charging apparatus according to claim 1, wherein said charging cable unit is provided detachably from said cable holder.

* * * * *